United States Patent [19]

Zobel et al.

[11] Patent Number: 5,079,025

[45] Date of Patent: Jan. 7, 1992

[54] PROCESS FOR THE REMOVAL OF ETHANOL FROM DRINKS PRODUCED UTILIZING EXTRACTION WITH COMPRESSED CARBON DIOXIDE AND CARBON DIOXIDE REGENERATION

[75] Inventors: Rudolf Zobel, Tacherting; Erwin Schütz, Trostberg; Heinz-Rüdiger Vollbrecht, Altenmarkt; Robert Faust, Garching, all of Fed. Rep. of Germany

[73] Assignee: SKW Trostberg Aktiengesellschaft, Trostberg, Fed. Rep. of Germany

[21] Appl. No.: 453,989

[22] Filed: Dec. 20, 1989

[30] Foreign Application Priority Data

Dec. 24, 1988 [DE] Fed. Rep. of Germany ....... 3843908

[51] Int. Cl.⁵ .............................. A23L 2/00; C12F 1/02
[52] U.S. Cl. ...................................... 426/590; 426/475; 426/487; 203/97; 203/98; 203/99; 203/DIG. 13; 55/68; 55/84; 55/89
[58] Field of Search ................. 426/592, 422, 590, 14, 426/474, 475, 487; 203/99, 49, 98, 97, DIG. 13, DIG. 19; 55/68, 84, 89; 568/913, 918

[56] References Cited

U.S. PATENT DOCUMENTS

| | | | |
|---|---|---|---|
| 3,969,196 | 7/1976 | Zosel | 203/49 |
| 4,140,799 | 2/1979 | Nagodawithana | 426/16 |
| 4,345,976 | 8/1982 | Peter | 203/49 |
| 4,478,686 | 10/1984 | Barth | 203/49 |
| 4,626,437 | 12/1986 | Schobinger | 426/592 |
| 4,639,257 | 1/1987 | Duckett | 203/41 |
| 4,769,112 | 9/1988 | Wheldon | 203/49 |
| 4,784,868 | 11/1988 | Young | 426/592 |
| 4,867,997 | 9/1989 | Wiesenberger | 426/494 |

FOREIGN PATENT DOCUMENTS

| | | |
|---|---|---|
| 2902067 | 5/1980 | Fed. Rep. of Germany . |
| 2912316 | 10/1980 | Fed. Rep. of Germany . |
| 3024055 | 1/1982 | Fed. Rep. of Germany . |
| 3313530 | 10/1984 | Fed. Rep. of Germany . |
| 3542757 | 6/1987 | Fed. Rep. of Germany . |
| 0077745 | 10/1982 | France . |

*Primary Examiner*—Carolyn Paden

[57] ABSTRACT

The present invention provides a process for the removal of ethanol from drinks produced by fermentation by direct extraction of the ethanol in countercurrent with compressed carbon dioxide as extraction agent and separation of the extracted water-ethanol mixture from the extraction agent by lowering the density of the compressed gas, wherein, after the lowering of the density, the carbon dioxide is regenerated by a treatment with water and then returned to the extraction step.

19 Claims, 1 Drawing Sheet

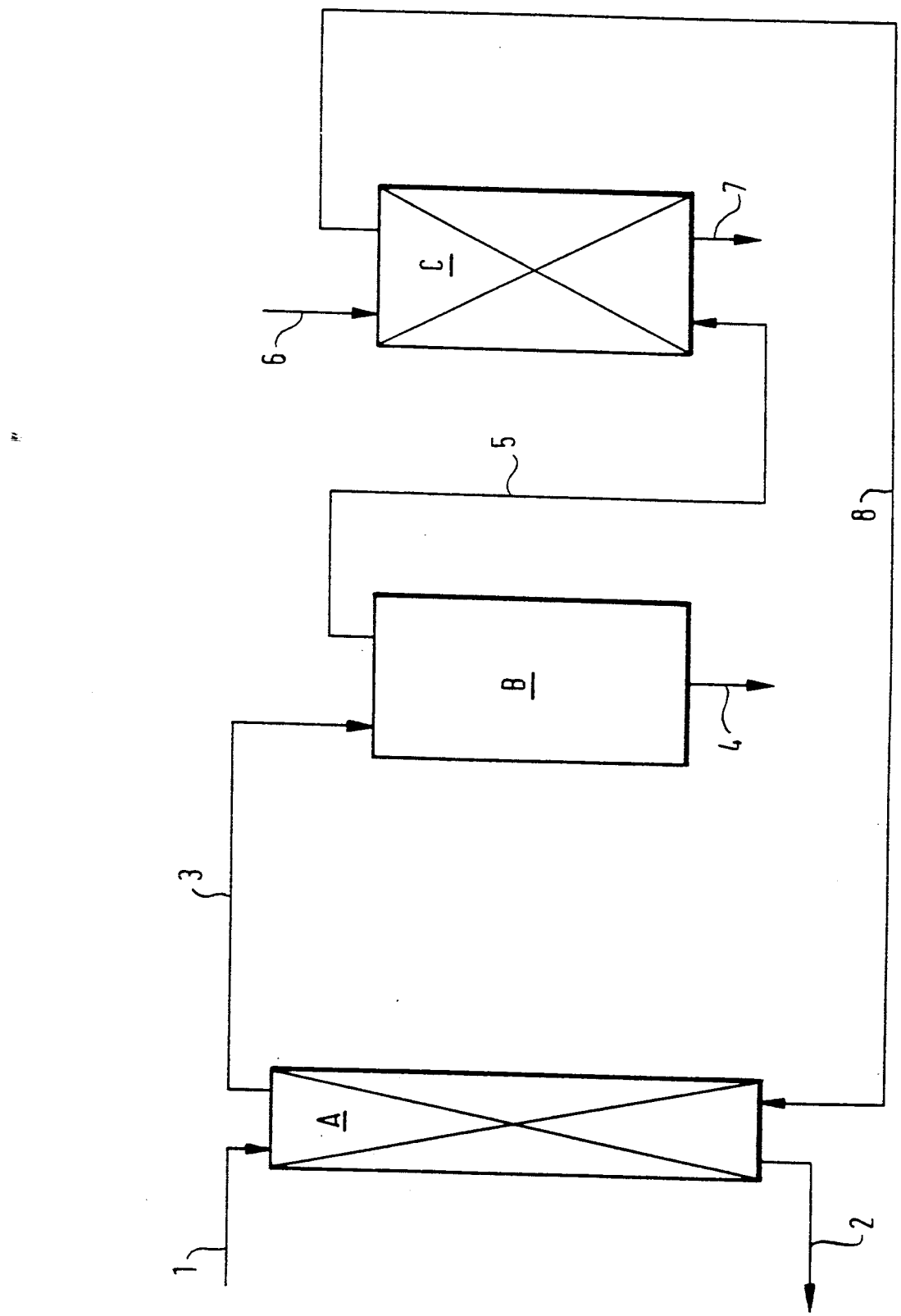

PROCESS FOR THE REMOVAL OF ETHANOL FROM DRINKS PRODUCED UTILIZING EXTRACTION WITH COMPRESSED CARBON DIOXIDE AND CARBON DIOXIDE REGENERATION

BACKGROUND OF THE INVENTION

The present invention is concerned with a process for the removal of ethanol from drinks produced by fermentation by means of extraction with the help of compressed carbon dioxide.

There is a general need substantially to remove alcohol from alcoholic drinks which have been produced by the alcoholic fermentation of sugar-containing aqueous liquids without negatively influencing the flavour quality of the drinks initially used. Examples of such alcoholic drinks include wine, fruit wine, for example cider, sparkling wine and sekt, as well as beer.

A number of processes is already known which are concerned with the production of alcohol-reduced or alcohol-free drinks but all of them involve certain disadvantages.

The older processes essentially use distillation or membrane separation for the removal of the alcohol in which case the obtaining of drinks substantially freed from alcohol with an alcohol content of less than 0.5% by volume give rise to certain difficulties which, in particular, are due to the fact that these processes display an insufficient separating effect between the ethanol, on the one hand, and the readily volatile aroma and flavour materials, on the other hand. Furthermore, in the case of the distillation processes, because of the comparatively high temperatures used, it can result in undesirable damage to the aroma and flavouring materials.

Recently, processes for the removal of alcohol by means of extraction with the help of compressed gases, for example carbon dioxide, have also been described. Thus, in Federal Republic of Germany Patent Specifications Nos. 29 02 067 and 30 24 055, it has been suggested to remove the alcohol with help of liquid or supercritical carbon dioxide and subsequently to separate it off from the carbon dioxide by decompression. However, with these processes it is only possible to reduce the alcohol content to 1 to 2% by volume. This also applies to the process according to Federal Republic of Germany Patent Specification No. 29 12 316 in which only partly fermented drinks (young beer or young wine) are treated with liquid carbon dioxide and the so-treated drinks are then subjected to a post-fermentation.

Low-alcohol drinks can be produced with the help of the process according to European Patent Specification No. 0,077,745 which is carried out in two steps. In the first step, the aromatic materials are extracted with liquid carbon dioxide, i.e. at subcritical pressure, and, in the second step, the alcohol is extracted. Subsequently, the aroma fraction is again mixed with the dealcoholated drink. The sharp separation of ethanol and aroma materials hereby give rise to particular problems, i.e. the two objects of removing the alcohol as far as possible and the maintenance of the flavour and aroma materials in the drink, can only be accomplished with difficulty.

Therefore, in Federal Republic of Germany Patent Specification No. 33 13 530, it is suggested, after removal of the alcohol with liquid or supercritical solvents, to pass the ethanol-containing solvent phase over an adsorption agent, for example active carbon. However, this process is rather laborious because the adsorption agent must again be regenerated. Furthermore, it cannot be excluded that valuable aroma materials are also adsorbed and thus are lost.

Also laborious is the process according to Federal Republic of Germany Patent Specification No. 35 42 757 in which the starting drinks are first subjected to a high pressure extraction with carbon dioxide in order to obtain an alcoholic fraction enriched with aroma materials, then the alcohol content of the remaining drink is reduced by vacuum distillation in a fractionation column and, at the same time, an aroma fraction is obtained with a higher boiling point than ethanol and subsequently the two aroma fractions are again added to the alcohol-reduced remaining drink.

SUMMARY OF THE INVENTION

Therefore, it is an object of the present invention to provide a process for the removal of ethanol from drinks produced by fermentation by direct extraction of the ethanol in countercurrent with compressed carbon dioxide as extraction agent and separation of the extracted water-ethanol mixture from the extraction agent by lowering the density of the compressed gas which does not display the mentioned disadvantages of the prior art but rather, with low technical expense, achieves a substantial reduction of the ethanol content without important aroma and flavour materials being lost.

Thus, according to the present invention, there is provided a process for the removal of ethanol from drinks produced by fermentation consisting essentially of direct extraction of the ethanol in countercurrent with compressed carbon dioxide as extraction agent and separation of the extracted water-ethanol mixture from the extraction agent by lowering the density of the compressed gas, wherein, after the lowering of the density, the carbon dioxide is regenerated by a treatment with water and then returned to the extraction step.

We have, surprisingly, found that, in this relatively easy way, dealcoholized drinks can be obtained with an alcohol content of less than 0.5% by volume and with good sensory properties.

BRIEF DESCRIPTION OF THE DRAWING

FIG. 1 is a block diagram illustrating the process according to the present invention.

DETAILED DESCRIPTION OF THE INVENTION

In the process according to the present invention, the starting drink, which in the case of wine can have an alcohol content of from about 9 to 12% by volume, is subjected to a high pressure extraction in countercurrent with compressed carbon dioxide. The extraction conditions with regard to pressure and temperature can thereby be varied within wide limits, i.e. the extraction can be carried out not only with liquid but also with super-critical carbon dioxide. The high pressure extraction is preferably carried out at a pressure of from 75 to 300 bar. The temperature should be so chosen that the temperature-sensitive flavour and aroma materials are not damaged. Therefore, the extraction temperature should be less than 40° C. and preferably 10° to 35° C.

The amount of carbon dioxide used for the extraction depends essentially upon the ethanol starting content of the drink and is, for example, in the case of wine from 5 to 100 kg. and preferably from 10 to 40 kg. of carbon dioxide per kg. of drink to be treated.

It is important for the present invention that the extraction of the alcohol from the drink is carried out by countercurrent contact between the drink and the carbon dioxide since only in this way is an optimum loading of the carbon dioxide with ethanol achieved which, in general, is from 3 to 8 g. of ethanol per kg. of carbon dioxide.

If desired, readily volatile aroma materials can be removed, for example with super-critical carbon dioxide, before the extraction of the alcohol according to the process of the present invention.

The high pressure extraction can be carried out with conventional extraction apparatus. However, it has proved to be advantageous to carry out the countercurrent extraction in a column and especially advantageously in a packed column. The packed column can thereby be provided with the conventional regular or irregular packings, for example Raschig rings or Pall rings.

After the high pressure extraction and the loading of the carbon dioxide with ethanol and a certain amount of water, according to the present invention, there is carried out a separation of the ethanol-water mixture from the carbon dioxide by lowering the density of the carbon dioxide. The separation conditions with regard to pressure and temperature can be varied within wide limits. The separation pressure is preferably from 30 to 60 bar and especially preferably from 35 to 50 bar and the separation temperature is preferably from $-10°$ to $+25°$ C. In the case of these preferred conditions, the greater part of ethanol and water is separated off in the form of an ethanol/water solution containing 30 to 70% of ethanol.

The remaining carbon dioxide gas contains only relatively small amounts of ethanol which, as a rule, are less than 1 g. per kg. of carbon dioxide.

In order to remove these residual amounts of ethanol from the carbon dioxide, in the process according to the present invention, the first separation step is followed by a treatment with water in which the carbon dioxide is almost completely regenerated. This gas wash with water is preferably carried out under the same pressure and temperature conditions as in the case of the decompression. Alternatively, a regeneration of the carbon dioxide with water can take place immediately before the extraction under the same temperature and pressure conditions as in the case of the extraction. The preferred temperature range for carrying out the gas wash is from 10° to 40° C. As a rule, 10 to 300 g. of water are used per kg. of carbon dioxide in order to wash out the residual amounts of ethanol and to reach an ethanol content of less than 0.4 g. per kg. of carbon dioxide. The gas washing can be carried out according to known processes and with conventional technical devices without any problems. As in the case of the extraction, there are preferably used packed columns with regular or irregular packings. After the gas washing, the carbon dioxide can again be brought to the extraction conditions without any further treatment and, after appropriate compressing or condensation and possibly heating or cooling, again returned to the extraction step. In this way, it is possible to carry out the process according to the present invention continuously with regard to the carbon dioxide gas flow.

In the FIGURE of the accompanying drawing, the process according to the present invention is illustrated graphically in the form of a block diagram.

Into a packed column (A), the starting drink to be freed from alcohol is fed in from above via a pipe (1), whereas compressed carbon dioxide is introduced into the column in countercurrent thereto from below via a pipe (8). After the extraction, the drink is removed via pipe (2), whereas the carbon dioxide loaded with ethanol and water emerges from the head of the column and is passed on via pipe (3) into a separator (B). The carbon dioxide is there depressurised and at the same time the main amount of ethanol and water separated off and the decompressed carbon dioxide gas is removed via a pipe (4). The decompressed carbon dioxide gas, which still contains small amounts of ethanol, is passed for washing via a pipe (5) into a column (C) which is suppled with water via a pipe (6). After the gas wash, the regenerated carbon dioxide is withdrawn via a pipe (8) and compressed. After the compressing, it is returned to the column (A), whereas the water-ethanol mixture is drawn off via a pipe (7).

With the help of the process according to the present invention, it is possible, under gentle conditions, to reduce alcohol-containing drinks, for example wine and the like, to residual contents of less than 0.5% by volume of alcohol without substantially impairing the sensory properties of the drink. Furthermore, the process can be accomplished with a relative small technical expense so that it is especially suitable for carrying out on a large scale.

The following Examples are given for the purpose of illustrating the present invention, reference thereby being made to the accompanying drawing:

EXAMPLE 1 (COMPARISON)

Removal of Alcohol from Wine Without Regeneration of the Carbon Dioxide Solvent with Water At the head of a high pressure column (A) filled with 15 mm. Pall rings, there is dosed in, with the help of a membrane metering pump, a wine containing 8.7% by weight of ethanol and warmed to 35° C. in an amount of 10 kg./hour via pipe (1). From below, there is passed upwardly through the column 300 kg./hour of carbon dioxide under a pressure of 150 bar which is introduced through the pipe (8). The carbon dioxide thereby removes the alcohol from the specifically heavier wine. The carbon dioxide loaded with ethanol and water is decompressed in the separator (B) to 50 bar. As extract, there is obtained about 1.7 kg./hour of a 40% aqueous ethanol solution. The extraction agent carbon dioxide is evaporated, condensed, compressed to 150 bar and, with a residual loading of about 1 g. ethanol/kg. of carbon dioxide, again returned to the extraction column (A). The wine freed from alcohol in this way still contains about 1.1 to 1.2% by weight of ethanol. Therefore, the aimed for alcohol content of less than 0.5% by volume cannot be achieved with this process.

EXAMPLE 2 (ACCORDING TO THE PRESENT INVENTION)

Removal of Alcohol from Wine with Regeneration of the Carbon Dioxide with the Help of Water The extraction of the ethanol from wine is carried out under the same pressure and temperature conditions as in Example 1. The carbon dioxide stream is here again 300 kg./hour but the amount of wine is 20 kg./hour. In the case of decompression of the loaded solvent, there are obtained about 2.4 kg./hour of an approximately 50% aqueous ethanol solution. The residual loading of the carbon dioxide with about 1 g. ethanol/kg. of carbon dioxide is reduced by a wash at 50 bar and 25° C. with 30 g. of water/kg. of carbon dioxide to less than 0.3 g. ethanol/kg. of carbon dioxide. The residual loading of the carbon dioxide suffices for a dealcoholisation of the wine in the existing column to an alcohol content of 0.4% by weight.

We claim:

1. A process for the removal of ethanol from drinks produced by fermentation, said process consisting essentially of:

directly extracting the ethanol in countercurrent with compressed carbon dioxide as the extracting agent to produce compressed carbon dioxide loaded with a water-ethanol mixture;

separating the extracted water-ethanol mixture from the extraction agent by lowering the density of the compressed $CO_2$;

regenerating the carbon dioxide after the density has been lowered by washing the carbon dioxide with water provided as a separate addition to the carbon dioxide, wherein the regeneration step results in the removal of residual amounts of ethanol from the $CO_2$ and a total ethanol content of the drink of less than 0.5% V/v, and returning the regenerated carbon dioxide to the extraction step.

2. Process according to claim 1 further characterized by carrying out the extraction with carbon dioxide at a pressure of from 75 to 300 bar and at a temperature of less than 40° C.

3. Process according to claim 2 further characterized by carrying out the extraction with carbon dioxide at a temperature of from 10° to 35° C.

4. Process according to claim 2 further characterized by using 5 to 100 kg. of carbon dioxide per kg. of starting drink.

5. Process according to claim 2 further characterized by carrying out said countercurrent extraction in a packed column.

6. Process according to claim 1 further characterized by using 5 to 100 kg. of carbon dioxide per kg. of starting drink.

7. Process according to claim 4 further characterized by using 10 to 40 kg. of carbon dioxide per kg. of starting drink.

8. Process according to claim 1 further characterized by carrying out said countercurrent extraction in a packed column.

9. Process according to claim 1 further characterized by carrying out said separation of the water-ethanol mixture at a pressure of from 30 to 60 bar and at a temperature of from $-10°$ to $+25°$ C.

10. Process according to claim 9 further characterized by using 5 to 100 kg. of carbon dioxide per kg. of starting drink.

11. Process according to claim 9 further characterized by carrying out the regeneration of the carbon dioxide of lowered density with water at the same pressure as in the case of said separation.

12. Process according to claim 9 further characterized by carrying out the regeneration of the carbon dioxide with water under the same pressure and temperature conditions as are used in the case of said extraction.

13. Process according to claim 1 further characterized by carrying out the regeneration of the carbon dioxide of lowered density with water at the same pressure as in the case of said separation.

14. Process according to claim 13 further characterized by carrying out the regeneration with water at a temperature of from 10° to 40° C.

15. Process according to claim 1 further characterized by carrying out the regeneration of the carbon dioxide with water under the same pressure and temperature conditions as are used in the case of said extraction.

16. Process according to claim 15 further characterized by carrying out the regeneration of the carbon dioxide with water under the same pressure and temperature conditions as are used in the case of said extraction.

17. Process according to claim 1 further characterized by carrying out the regeneration with water at a temperature of from 10° to 40° C.

18. Process according to claim 1 further characterized by using 10 to 300 g. of water per kg. of carbon dioxide for the regeneration of the carbon dioxide.

19. Process according to claim 1 further characterized by continuously passing the carbon dioxide in a cycle.

* * * * *